Feb. 27, 1923.

G. H. BALZEREIT 1,447,005

ICE CREAM CABINET

Filed Nov. 22, 1921

INVENTOR
George Henry Balzereit.
BY Robert M. Barr
ATTORNEY

WITNESS
F. J. Hartman.

Patented Feb. 27, 1923.

1,447,005

UNITED STATES PATENT OFFICE.

GEORGE HENRY BALZEREIT, OF PHILADELPHIA, PENNSYLVANIA.

ICE-CREAM CABINET.

Application filed November 22, 1921. Serial No. 516,914.

*To all whom it may concern:*

Be it known that I, GEORGE HENRY BALZEREIT, a citizen of the United States, and a resident of Philadelphia, county of Philadelphia, State of Pennsylvania, have invented certain new and useful Improvements in Ice-Cream Cabinets, of which the following is a specification.

Some of the objects of the present invention are to provide an ice cream cabinet having a variable capacity; to provide an improved cabinet for ice cream whereby the cost of packing is materially reduced and heretofore unavoidable waste prevented; to provide means whereby the capacity of an ice cream cabinet can be regulated in accordance with trade conditions; to provide an ice cream cabinet whereby dealers, retailers or anyone handling quantities of ice cream can efficiently take care of a supply of ice cream to meet a maximum demand and also be prepared, in case the demand decreases or falls to a minimum, to meet such demand with a lessened supply of ice cream handled without loss; to provide an improved cabinet wherein the quantity of ice. salt, etc. for packing purposes can be effectively proportioned in accordance with the quantity of ice cream to be packed; to provide an ice cream cabinet having a movable element serving as a bounding wall of the cabinet; and to provide other improvements as will hereinafter appear.

Figure 1:
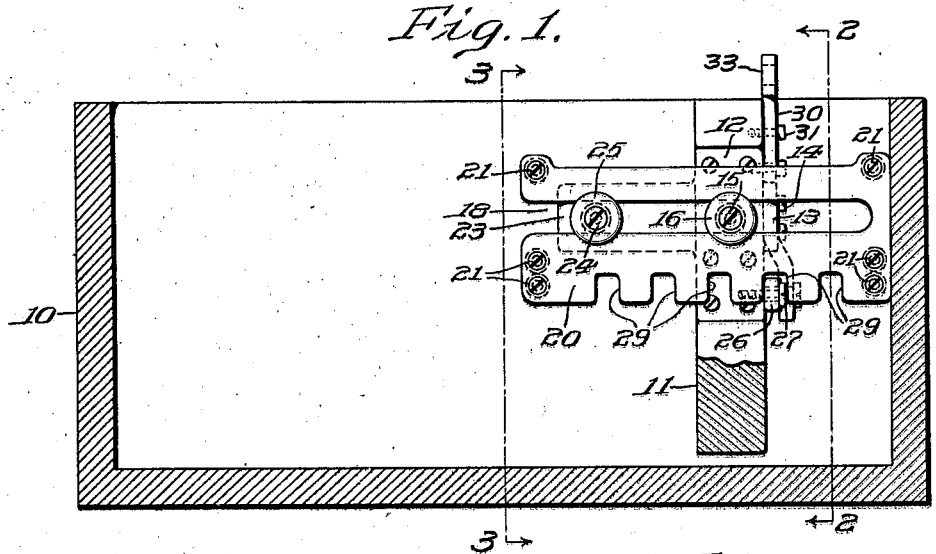
Figure 2:
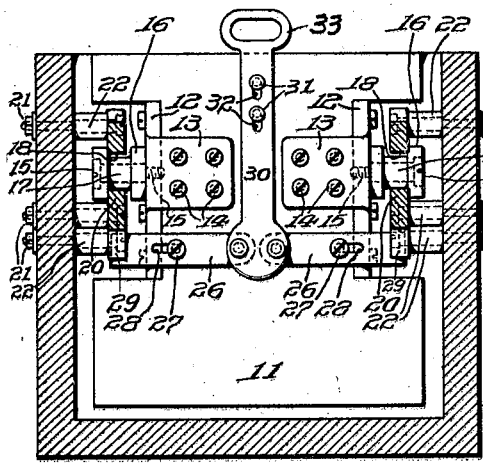
Figure 3:
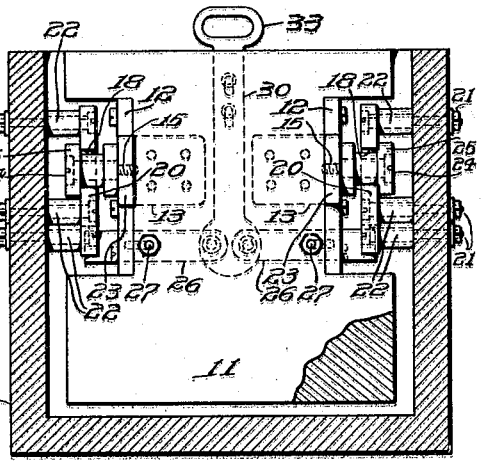
Figure 4:
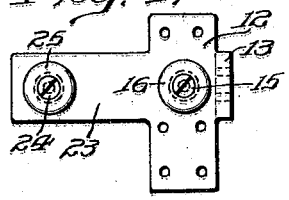
Figure 5:
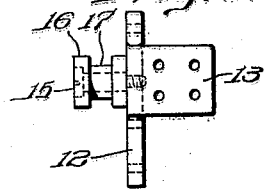

In the accompanying drawings, Fig. 1 represents a sectional elevation of an ice cream cabinet embodying one form of the present invention; Fig. 2 represents a section on line 2—2 of Fig. 1; Fig. 3 represents a section on line 3—3 of Fig. 1; Fig. 4 represents a detail, in side elevation, of one form of supporting bracket employed; and Fig. 5 represents an end elevation of of the same.

Referring to the drawings, a box or receptacle 10 is shown, of the type generally employed for packing ice cream containers, namely a rectangular heavy walled receptacle adapted to hold the ice in which the ice cream containers are packed. Receptacles of this type are ordinarily known in the trade as "cabinets" and are used by all dealers and retailers in ice cream to maintain relatively large quantities of ice cream in a frozen condition until used.

For the purpose of varying the capacity of the box or cabinet 10 so that the quantity of ice cream packed therein can be varied in accordance with trade conditions, a movable element or wall 11 is provided which is arranged transversely within the cabinet 10 and has sufficient clearance to be freely moved relative to the walls thereof. In the present construction the movable element 11 forms an auxiliary movable end wall for the cabinet 10 and its path of movement is lengthwise of the cabinet 10, though this is only by way of example as obviously the capacity of the cabinet 10 could be varied by arranging the element 11 for movement transversely, or in any other suitable way.

In order to support the movable element 11 in a manner for the correct carrying out of its function, it is preferably recessed at two opposite side edges to receive respectively two brackets 12, each of which is bolted or otherwise rigidly fastened to the element 11, and has an angle plate 13 seated against the rear face of the element 11 and held fast by screws 14 or equivalent means. Each bracket 12 carries a laterally projecting stud or headed pin 15 which serves as a journal for a roller 16, the respective shanks 17 of which have a bearing and ride within slots 18 formed in two guide members 20. Suitable bolts 21 having spacing sleeves 22 thereon serve to rigidly fasten the members 20 to the respective side walls of the cabinet 10 in parallel relation. The slots 18 are preferably open at one end for assembling purposes and have a width sufficient to provide a slight clearance about the roller shanks 17 to prevent binding and to allow ready adjustment of the wall 11.

As a means to relieve the strain on the supporting parts due to thrust pressure on the bottom of the wall 11 by the packed ice, the brackets 12 are provided respectively with extension arms 23, each of which is provided with a stud 24 carrying a roller 25. These studs 24 and rollers 25 are similar to those heretofore described and the mounting thereof is such that each is in horizontal alinement with the adjacent roller 16. Thus each bracket 12 has two projecting rollers 16 and 25 arranged to ride in the same slot 18, so that altogether they resist any tendency of the movable wall 11 to be forced out of position by end thrust. From the foregoing it will be evident that the movable element 11 is supported at two opposite side edges by bifurcated guide members 20 and rollers 16 and 25, so that the element 11 can be readily moved from one position to another within the cabinet 10 to thereby reduce or increase the capacity of such cabinet.

For locking the element 11 in any determined position, it is provided with two keepers 26 pivoted to the element 11 or any suitable part thereof by a pin 27 and slot 28 connection to extend in locking position in opposite directions to interfit with the respective guide members 20. Preferably the lower edge of each of these members 20 is provided with a series of notches 29, each of which is arranged to receive the end portion of the respective keepers 26. Horizontally considered the two series of notches 29 are in alinement, so that the two keepers 26 simultaneously seat in a pair of opposite notches 29 and lock the element 11 in its selected position. The long arms of the pivoted keepers 26 are both connected to the end of a hand shift bar 30 which is held in position and guided by pins 31 fixed to the element 11 and riding respectively in slots 32 of the bar 30. A loop 33 forms a handle in the bar 30 to raise it to cause the keepers 26 to be released, while the weight of the bar 30 is sufficient to return the keepers to locking position when the handle is released after properly positioning the element 11.

It will now be apparent that a complete unitary cabinet for ice cream has been provided wherein the ice and salt packing capacity can be varied according to requirements and so proportioned as to efficiently take care of minimum quantities of ice cream as well as maximum quantities. For example, if less than the normal capacity of the cabinet is to be used, the hand bar 30 is lifted to cause the keepers 26 to be released from locking engagement with the members 20. This releases the element 11 so that it can be moved to the required position to give the necessary ice and salt capacity to maintain the ice cream in a frozen condition, and when so positioned the bar 30 is released to fall by gravity and bring the keepers 26 into another pair of the notches 29 to again lock the element 11. Thus instead of filling the entire cabinet with ice and salt to maintain a relatively small quantity of ice cream in condition, only the amount of ice and salt actually necessary to that end need be provided. The saving in material, labor and handling is evident.

Having thus described my invention, I claim:

1. The combination of an ice cream cabinet, a movable wall forming one side thereof, means including guides and rollers for mounting said wall for adjustment to change the capacity of said cabinet according to requirements, and means to lock said wall in any adjusted position.

2. The combination of an ice cream cabinet, a movable wall arranged to form one side thereof, means for suspending said wall within said cabinet, a device for locking said wall in a selected position, and means out of the zone of ice in said cabinet for preventing displacement of the lower end of said wall under end thrust pressure of the contents of said cabinet.

3. The combination of an ice cream cabinet, a movable wall arranged to form one side thereof, means for suspending said wall within said cabinet for movement towards and away from the opposite side of said cabinet, a device for locking said wall in a selected position, and means out of the ice zone of said cabinet and cooperating with said suspending means to prevent displacement of the lower end of said wall under end thrust pressure of the contents of said cabinet.

4. The combination of an ice cream cabinet, a movable wall slidably mounted within said cabinet and arranged to permit access to the contents of said cabinet in any position of said wall, and means to lock said wall in any selected position, whereby the capacity of said cabinet can be varied to suit conditions.

Signed at Philadelphia, county of Philadelphia, State of Pennsylvania, this 21st day of November, 1921.

GEORGE HENRY BALZEREIT.